United States Patent [19]
Uno

[11] Patent Number: 5,983,031
[45] Date of Patent: Nov. 9, 1999

[54] LENS SHUTTER CAMERA EQUIPPED WITH ZOOM LENS SYSTEM

[75] Inventor: Tetsuya Uno, Sakai, Japan

[73] Assignee: Minolta Co., Ltd., Osaka, Japan

[21] Appl. No.: 09/166,101

[22] Filed: Oct. 5, 1998

[30] Foreign Application Priority Data

Oct. 6, 1997 [JP] Japan .................................. 9-272527

[51] Int. Cl.⁶ .............................. G03B 7/00; G03B 9/08
[52] U.S. Cl. .............................. 396/72; 396/83; 396/87; 396/236; 396/451
[58] Field of Search .................................. 396/72, 83, 79, 396/85, 87, 236, 451, 462

[56] References Cited

U.S. PATENT DOCUMENTS 4,870,439  9/1989  Tsuboi et al. ........................ 396/82
5,134,525  7/1992  Kaneda ............................... 396/85 X
5,223,873  6/1993  Tsuboi ................................ 396/77

FOREIGN PATENT DOCUMENTS 03116030A   5/1991  Japan .
04331937A  11/1992  Japan .

*Primary Examiner*—W. B. Perkey
*Attorney, Agent, or Firm*—Burns, Doane, Swecker & Mathis, LLP

[57] ABSTRACT

The rotation of the motor 60 located outside the lens barrel is transmitted to the shutter blades 74 that move along the optical axis together with the lens barrel by means of the gear train 62, the drive shaft 64 that is engaged with the output gear 63 of the gear train 62, the gear tube 66 that is engaged with the drive shaft 64 and has the engaging hole 67 through which the drive shaft 64 can extend and retract, and the gear 72 that is engaged with the gear 68 of the gear tube 66.

13 Claims, 4 Drawing Sheets

LENS SHUTTER CAMERA EQUIPPED WITH ZOOM LENS SYSTEM

This application is based on application No. Hei 9-272527 filed in Japan, the content of which is hereby incorporated by reference.

BACKGROUND OF THE INVENTION

1. Field of the Invention

The present invention pertains to a lens shutter camera equipped with a zoom lens system.

2. Description of the Prior Art

As disclosed in U.S. Pat. No. 5,223,873, for example, a technology for a compact zoom lens system has been proposed in which the size of the lens barrel is reduced by using a construction in which focusing and zooming are performed by a single actuator, eliminating the need for a focusing drive motor inside the lens barrel. However, a shutter drive actuator still resides inside the lens barrel, which poses a hindrance to making the lens barrel smaller.

An attempt to locate the actuator outside the lens barrel was described in U.S. Pat. No. 4,870,439, for example. However, while technologies have been proposed for fixed focal length cameras or focal length switchover cameras, cameras having a zoom lens mechanism, in which the lenses are moved for relatively large distances and must be stopped at certain positions, have not been considered.

SUMMARY OF THE INVENTION

Therefore, the object of the present invention is to provide a lens shutter camera equipped with a zoom lens system and in which the diameter of the lens barrel may be reduced.

One aspect of the present invention comprises a camera having a construction in which the lens units and shutter mechanism located inside the lens barrel move along the optical axis, wherein an actuator that provides the drive power to drive the shutter blades of the shutter mechanism is located outside the lens barrel and wherein said camera further has a drive transmission mechanism that transmits the drive power from the actuator to the shutter mechanism.

In this mechanism, the drive power from the actuator located outside the lens barrel is transmitted to the shutter mechanism inside the lens barrel via a drive transmission mechanism. Because the actuator to drive the shutter is not located inside the lens barrel, the diameter of the lens barrel may be made smaller.

In another aspect of the present invention, the actuator that provides drive power to move the lens units inside the lens barrel along the optical axis, as well as the actuator to drive the shutter, are located around the periphery of a fixed barrel.

Using this construction, the actuator for moving the lens units is not located inside the lens barrel, and therefore the diameter of the lens barrel may be further reduced. In addition, by having the actuator that moves the lens units and the actuator that drives the shutter be located on the around the periphery of the fixed lens barrel barrel, the drive transmission path to the lens barrel interior may be shortened, and the camera itself may be made more compact.

In another aspect of the present invention, the actuator that moves the lens units is driven during zooming and focusing.

Using this construction, the actuator used for zooming and focusing need not be located inside the lens barrel, and therefore, the diameter of the lens barrel may be reduced.

In another aspect of the present invention, the drive transmission mechanism is located on the imaging side relative to the shutter blade, as well as close to the longer edge of the light-receiving surface.

Using this construction, the drive transmission mechanism may be located so as not to interfere with the extendable lens barrel or block the light rays reaching the light receiving surface.

In another aspect of the present invention, the drive transmission mechanism moves along the optical axis when the lens barrel moves, and includes a member to transmit as rotational force the drive from the actuator that drives the shutter.

Using this construction, even where the shutter blades move along the optical axis during zooming, rotational force may be transmitted to the shutter blades, and the shutter blades may be driven.

In another aspect of the present invention, the shutter mechanism is equipped with a shutter blade control member that is located adjacent to the shutter blades and controls the operation of the shutter blades.

Using this construction, the shutter mechanism itself may be made smaller.

In another aspect of the present invention, the actuator that drives the shutter is fixed to the fixed barrel.

Using this construction, the actuator that drives the shutter can, together with the drive transmission mechanism, be mounted to the lens barrel before it is assembled into the camera body, and the lens barrel can be assembled into the camera body, which makes the assembly of the camera easy.

In another aspect of the present invention, the drive transmission mechanism is equipped with an intermediate transmission member constructed such that during zooming it moves along the optical axis by an amount that differs from the amount of movement of the shutter mechanism along the optical axis.

Using this construction, even in a construction in which the amount of movement of the lens barrel during zooming varies, driving may be performed such that the drive transmission mechanism moves without regard to this variation.

In another aspect of the present invention, the drive from the actuator that drives the shutter is transmitted via both forward and backward rotation.

Using this construction, the opening and closing of the shutter can be transmitted via rotation even if the shutter blades are moving along the optical axis during zooming.

In another aspect of the present invention, the drive transmission mechanism is located outside the circumference of at least one of the lenses that can move along the optical axis.

Using this construction, driving is possible irrespective of the form of the lens shutter. For example, driving is possible even where the shutter unit is located on the object side of the lens in the manner of a between-the-lens shutter.

In another aspect of the present invention, at least one of the lenses that can move along the optical axis has a notch in its circumference. At least one part of the drive transmission mechanism is located in this notch.

Using this construction, the lens barrel does not become large along its diameter.

In another aspect of the present invention, the camera has a shutter movement detector that detects the amount of movement of the shutter drive mechanism along the optical axis, whereby driving of the actuator that drives the shutter is controlled in response to the detected amount of movement of the shutter drive mechanism.

Using this construction, exposure errors caused by errors in the position of the shutter unit may be prevented.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
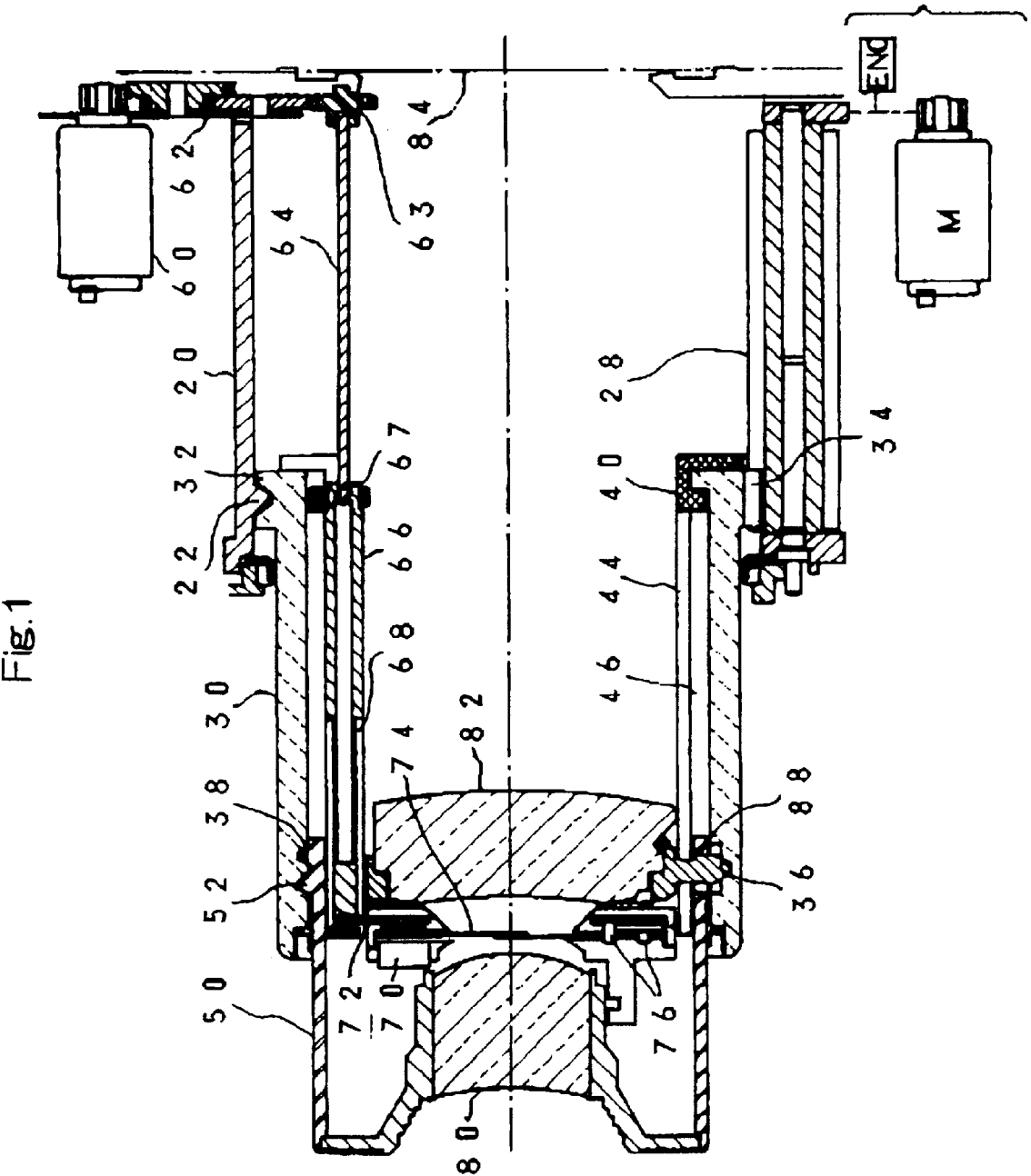
FIG. 1 is a cross-sectional view of a lens shutter camera of an embodiment of the present invention, in which the lenses are at the telephoto end position.
Figure 2:
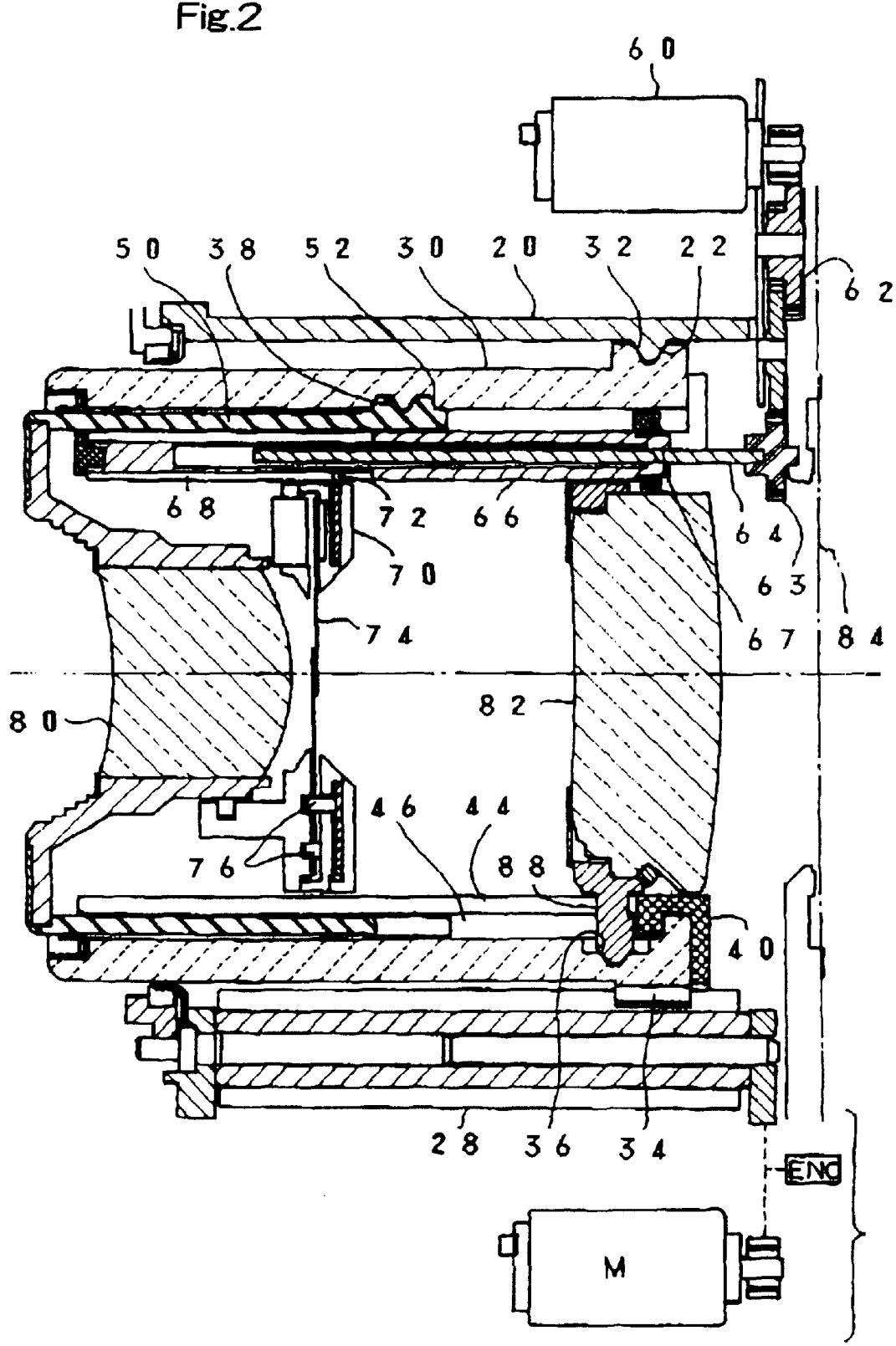
FIG. 2 is a cross-sectional view of the camera of FIG. 1 in which the lenses are at the wide-angle end position.
Figure 3:
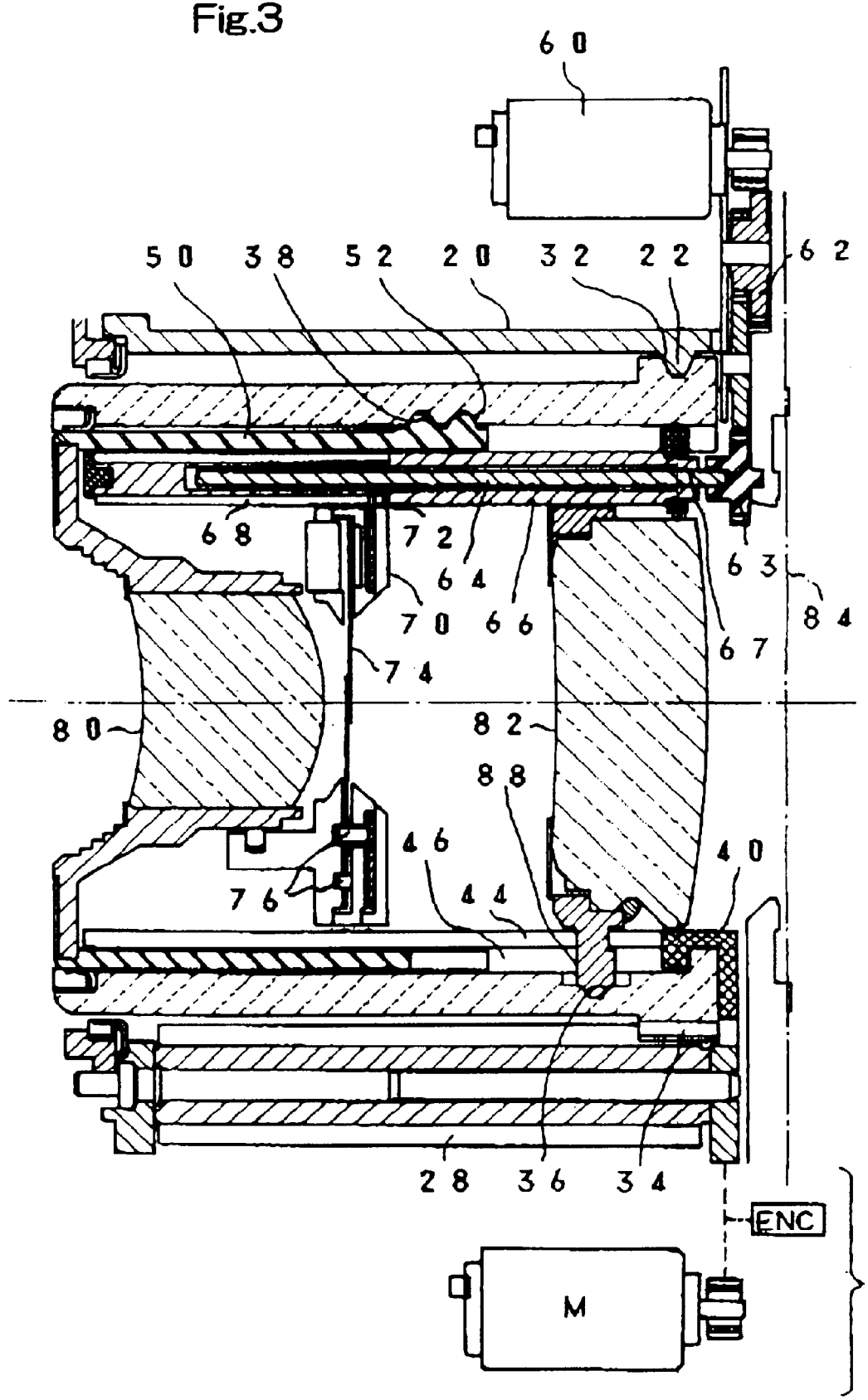
FIG. 3 is a cross-sectional view of the camera of FIG. 1 in which the lenses are completely retracted inside the camera.

An embodiment of the present invention shown in FIGS. 1 through 4 will now be explained in detail.

First, the basic construction will be explained. The camera shown in the drawings has a zoom lens system that comprises two lens units and extends from and retracts into the camera, a fixed barrel 20, a rotating barrel 30, a straight moving barrel 40, a forward moving barrel 50, a long gear 28, a shutter unit 70 and a shutter drive mechanism.

The rotating barrel 30 is located inside the fixed barrel 20. A spiral helicoid 22 and a straight movement guide groove 24 (see FIG. 4) are located on the inner surface of the fixed barrel 20. A gear portion 34 that engages with the long gear 28 located along the fixed barrel 20 is located on the outer surface of the rotating barrel 30 at its rear end. A helicoid 32 that engages with the helicoid 22 of the fixed barrel 20 is formed on a part of the gear portion 34.

Figure 4:
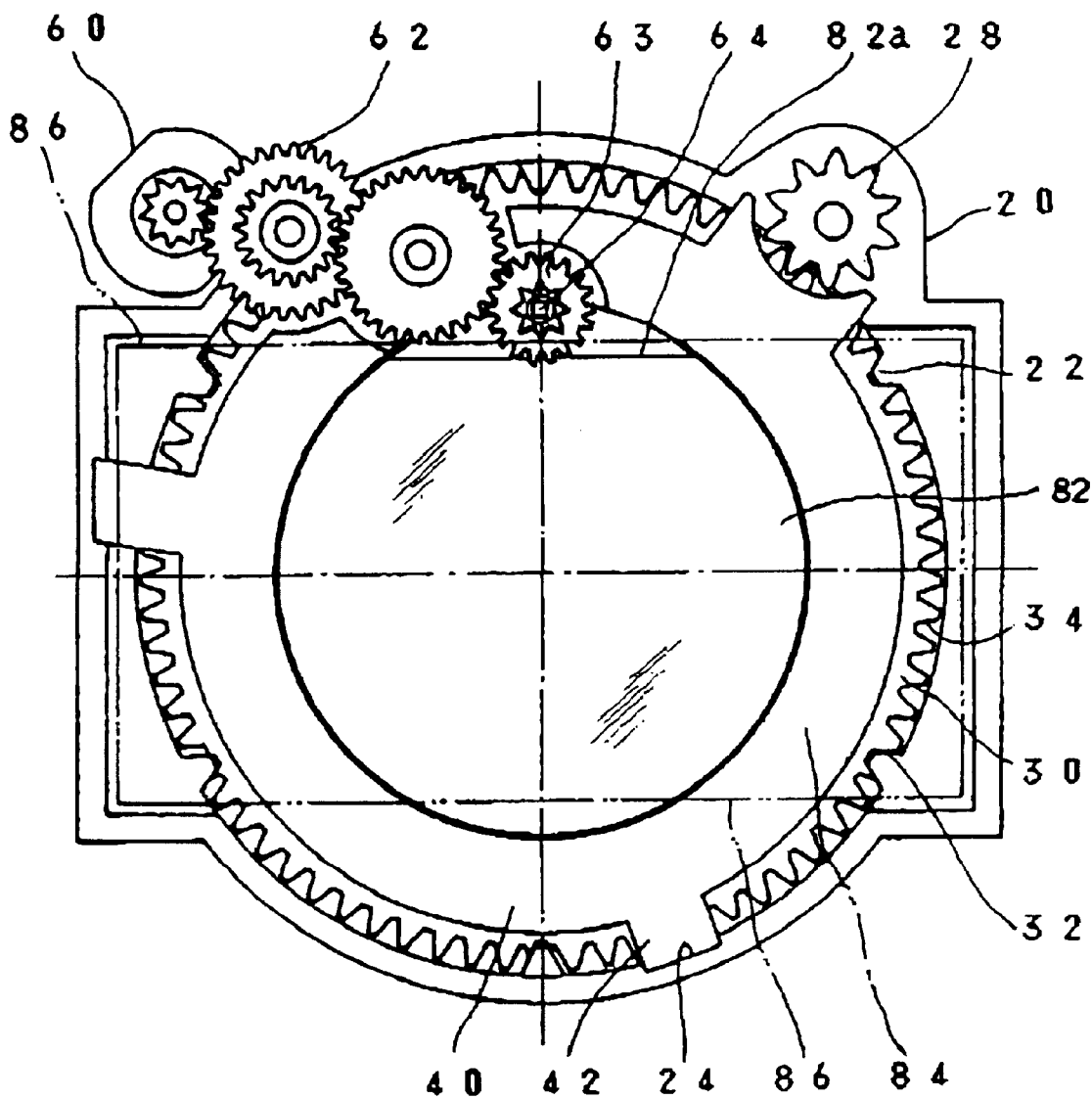
FIG. 4 is an abbreviated cross-sectional view of the camera of FIG. 1 cut along a plane perpendicular to the optical axis.

The straight moving barrel 40 is located inside the rotating barrel 30. The rotating barrel 30 and the straight moving barrel 40 are linked such that they can rotate relative to each other, yet move together as a single unit along the optical axis. They also support a second lens unit 82. In other words, the support pin 88 of the lens holder of the second lens unit 82 engages with the cam groove 36 of the rotating barrel 30 and the straight movement guide groove 44 of the straight moving barrel 40, and is supported by these members, such that the second lens unit 82 is driven in accordance with the cam groove configuration. A helicoid screw groove 38 is located on the inner surface of the rotating barrel 30. As shown in FIG. 4, an engaging protrusion 42 protrudes outward from the rear end of the straight moving barrel 40 away from it so as to engage with the straight movement guide groove 24 of the fixed barrel 20. A straight movement key 46 that guides the forward moving barrel 50 in a straight line is located on the straight moving barrel 40.

The forward moving barrel 50 is locate between the straight moving barrel 40 and the rotating barrel 30. A helicoid 52 that engages with the helicoid screw groove 38 located on the inner surface of the rotating barrel 30 is located on the outer surface of the forward moving barrel 50. The forward moving barrel 50 supports the first lens unit 80 and the shutter unit 70.

In this zoom lens system, when the long gear 28 rotates due to the drive motor M located in the camera body, the rotating barrel 30 moves along the optical axis while rotating due to its engagement with the fixed barrel 20 via the helicoid. At the came time, because the rotation of the forward moving barrel 50 that is engaged with the rotating barrel 30 via a helicoid is prohibited by the straight moving barrel 40, the forward moving barrel 50 moves along the optical axis relative to the rotating barrel 30 and the straight moving barrel 40. The lens barrel is extended and contracted in this fashion.

The drive motor X performs both zooming and focusing. It is constructed so as to alternately perform zooming and focusing by having the cam groove 36 have a step-shaped lead. In this way, the number of drive sources can be reduced and the transmission mechanism can be simplified.

An encoder ENC is connected to the drive motor M such that the amount of operation of the drive motor M is detected. This operation amount is used in the manner described below when the shutter unit 70 moves, the amount of incident light changes accordingly. Therefore, the amount of driving of the shutter, i.e., the amount of operation of the drive motor 60, is adjusted in accordance with the zoom position. However, it is possible for the shutter unit 70 to deviate from its design position due to errors in design or assembly, or due to backlash of any of the components. Because of this, exposure errors can occur even if the drive motor 60 is driven in accordance with the design. In order to correct these errors, the relationship between the operation amount or the drive motor sought by means of the encoder ENC and the actual position of the shutter unit 70 (i.e., the correction amount) is measured beforehand in the assembly process, and this relationship is stored in a ROM or other memory unit in the camera. The amount by which the drive motor 60 is driven is corrected based on the drive motor operation amount sought by the encoder ENC and the stored correction amount, and correct exposure may thereby be obtained.

It is also acceptable if the encoder ENC does not detect the drive motor operation amount, but instead detects the actual position of the shutter unit relative to a fixed member, and the detected position is directly used for exposure calculation.

The shutter drive mechanism will now be explained. The shutter drive mechanism has a drive motor 60, a gear train 62, a linking shaft 64 and a gear tube 66.

The drive motor 60 is located on the outside of the fixed barrel 20 in the camera body, or on the longer edge 86 side of the light receiving surface 84 of the film, i.e. at the top side in FIG. 4. The light receiving surface 84 is delineated by a rectangular exposure aperture formed in the camera body. The gear train 62 is located at the rear end of the lens barrel, and transmits the rotation of the drive motor 60 to the linking shaft 64.

The linking shaft 64 and the gear tube 66 have a construction in which the former is fitted inside the latter, and are located inside the lens barrel in a parallel fashion along the lens barrel axis, on the longer edge 86 side of the light receiving surface 84 of the film, such that they do not block the effective light rays passing through the lens barrel. The linking shaft 64 has an essentially rectangular cross-sectional configuration. An engaging hole 67 that has an essentially rectangular cross-sectional configuration and that extends along the lens barrel axis is formed in the gear tube 66, and the linking shaft 64 protrudes from this engaging hole 67. Using this construction, driving of the shutter by the drive source (motor) inside the camera body is possible regardless of whether the lens units have been extended significantly from the camera for zooming. The gear tube 66 is rotatably supported inside the straight moving barrel 40. One end of the linking shaft 64 is fixed to the output gear 63 of the gear train, and the other end is supported in the engaging hole 67 of the gear tube 66. By means of the engaging of the linking shaft 64 and the linking hole 67 of the gear tube 66, the linking shaft 64 and the gear tube 66 extend and contract when the forward moving barrel 50 moves in relation to the extension and contraction of the lens barrel. They also rotate as a single unit at all times. The second lens unit 82 on the side of the longer edge 86 of the light receiving surface 84 of the film has a notch 82a, as shown in FIG. 4, in order to allow for the sear tube 66 to be located there. As a result, the drive source (motor) inside the camera body can drive the shutter beyond the lens.

The shutter unit 70 is fixed to the forward moving barrel 50 that moves by means of the combination of the leads of the helicoids 22 and 32 and the leads of the helicoids 38 and 52, and the gear tube 66 is supported by the straight moving barrel 40 that moves by means of the leads of the helicoids 22 and 32. As a result, the shutter unit 70 and the gear tube 66 move along the optical axis at different speeds (drive amounts). However, a gear 68 is formed on the outer surface of the front part of the gear tube 66, and even if the lens barrel extends and contracts, and the shutter unit 70 fixed to the forward moving barrel 50 moves along the optical axis relative to the gear tube 66 supported by the straight moving barrel 40, the gear tube 68 always engages with the gear 72 of the shutter unit 70. When the forward or backward rotation of the shutter drive mechanism including the gear 68 is transmitted to the gear 72 of the shutter unit 70, the position of the pin 76 that is engaged with the shutter blades 74 moves forward or backward, and the shutter blades 74 open or close. In other words, the operation of the shutter blades 74, that is, the stopping-down/open operation of the shutter unit 70 is controlled by the gear 72.

As described above, because the actuator to drive the shutter unit is not located inside the lens barrel in the zoom lens system of this camera, the lens barrel diameter can be reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera comprising:
   a lens barrel constituted by a plurality of barrels;
   a lens unit, provided in said lens barrel, which moves along an optical axis thereof for zooming; and
   a shutter mechanism, provided in said lens barrel, which includes shutter blades and moves along the optical axis upon zooming;
   characterized in further provision of;
   an actuator which supplies a drive power to drive said shutter blades for opening/closing is located outside said lens barrel; and
   a drive transmission mechanism that transmits the drive power from said actuator to said shutter mechanism.

2. A camera according to claim 1 further comprising:
   a second actuator which provides drive power to move said lens unit inside said lens barrel along the optical axis;
   and wherein, said actuators are located around the periphery of a fixed barrel which is one of said barrels constituting said lens barrel.

3. A camera according to claim 2, wherein said second actuator is driven during zooming and focusing.

4. A camera according to claim 1, wherein said drive transmission mechanism is located on the imaging side relative to said shutter blade, as well as close to the longer edge of the light-receiving surface delineated by an exposure aperture.

5. A camera according to claim 1, wherein said drive transmission mechanism moves along the optical axis when the lens barrel moves, and said drive transmission mechanism includes a member to transmit as rotational force the drive from said actuator.

6. A camera according to claim 5, wherein the drive from said actuator is transmitted via both forward and backward rotation.

7. A camera according to claim 1, wherein said shutter mechanism is equipped with a shutter blade control member which is located adjacent to said shutter blades and controls the operation of said shutter blades.

8. A camera according to claim 1, wherein said actuator is fixed to a fixed barrel which is one of said barrels constituting said lens barrel.

9. A camera according to claim 1, wherein said drive transmission mechanism is equipped with an intermediate transmission member constructed such that during zooming it moves along the optical axis by an amount which differs from the amount of movement of the shutter mechanism along the optical axis.

10. A camera according to claim 1, wherein said drive transmission mechanism is located outside the circumference of at least one lens of said lens unit which is movable along the optical axis.

11. A camera according to claim 10, wherein said lens has a notch in its circumference, and at least one part of said drive transmission mechanism is located in the notch.

12. A camera according to claim 1, further comprising a shutter movement detector which detects the amount of movement of said shutter mechanism along the optical axis, whereby driving of said actuator is controlled in response to the detected amount of movement of said shutter mechanism.

13. A camera having a construction in which:
   a lens unit and a shutter mechanism located inside a lens barrel move along an optical axis thereof;
   wherein an actuator that provides a drive power to drive shutter blades of said shutter mechanism is located outside said lens barrel; and
   wherein said camera further has a drive transmission mechanism which transmits the drive power from said actuator to said shutter mechanism.

* * * * *